US006951629B2

(12) United States Patent
Kronseder (10) Patent No.: US 6,951,629 B2
(45) Date of Patent: Oct. 4, 2005

(54) BLOW MOLD AND METHOD FOR ADJUSTING A BLOW MOLD

(76) Inventor: Hermann E. H. Kronseder, Regensburger Str. 42, Woerthe a.d. Donau (DE), 93086

( * ) Notice: Subject to any disclaimer, the term of this patent is extended or adjusted under 35 U.S.C. 154(b) by 275 days.

(21) Appl. No.: 10/297,078

(22) PCT Filed: May 28, 2001

(86) PCT No.: PCT/EP01/06080
§ 371 (c)(1),
(2), (4) Date: May 28, 2003

(87) PCT Pub. No.: WO01/92168
PCT Pub. Date: Dec. 6, 2001

(65) Prior Publication Data
US 2004/0104517 A1 Jun. 3, 2004

(30) Foreign Application Priority Data
May 31, 2000 (DE) .......................... 100 27 111

(51) Int. Cl.$^7$ .............................................. B29C 49/56
(52) U.S. Cl. .............................. 264/532; 65/68; 65/360; 65/361; 264/523; 425/182; 425/195; 425/529; 425/540; 425/541
(58) Field of Search ................................ 425/541, 540, 425/195, 182, 451.4, 529, 451.9; 65/360, 361, 68; 264/532, 523

(56) References Cited

U.S. PATENT DOCUMENTS

| 1,720,598 | A | * | 7/1929 | Hall ........................... 65/233 |
| 2,757,485 | A | * | 8/1956 | Fedevich ...................... 65/167 |
| 3,195,186 | A | | 7/1965 | Gauban et al. |
| 3,199,970 | A | * | 8/1965 | Dierksheide .................. 65/360 |
| 3,344,475 | A | * | 10/1967 | Gioe ........................... 425/330 |
| 3,685,943 | A | * | 8/1972 | Fischer ....................... 425/533 |
| 3,778,246 | A | | 12/1973 | Rankl |
| 3,867,123 | A | * | 2/1975 | Hamilton ..................... 65/359 |
| 5,474,438 | A | * | 12/1995 | Walker, Jr. ................... 425/185 |
| 5,683,729 | A | * | 11/1997 | Valles ......................... 425/526 |
| 6,805,548 | B1 | * | 10/2004 | Evrard ........................ 425/540 |

FOREIGN PATENT DOCUMENTS

| DE | 6942384 | 10/1969 |
| DE | 32081 B3 | 3/1970 |
| DE | 1911600 | 9/1970 |
| FR | 610516 | 8/1926 |
| GB | 120416 | 11/1918 |

* cited by examiner

Primary Examiner—Robert B. Davis
(74) Attorney, Agent, or Firm—Marshall, Gerstein & Borun LLP (57) ABSTRACT

A blow mold (1) for a stretching machine or a glass blowing machine, comprising two mold halves (3, 4) which are pivotably connected by at least one connecting pin (2), and a shutting device and locking device in the form of a closing clamp (7) which can be slid directly onto the mold halves (3, 4) from the side of the connecting pin (2). The mold halves (3, 4) are closed around the connecting pin (2) by the sliding, pressing contact of the closing clamp (7) and in the closed position, are pressed against each other without a gap, resulting in a mechanically simple, space-saving blow mold (1).

14 Claims, 7 Drawing Sheets

BLOW MOLD AND METHOD FOR ADJUSTING A BLOW MOLD

FIELD OF THE INVENTION

The invention relates to a blow mold for molding glass containers such as for beverage bottles.

BACKGROUND OF THE INVENTION

The blow mould known from DE 69 42 384 T2 has two arms which are hinged like pliers to an axis. Each arm carries three juxtaposed mould halves. Both arms are pivoted to each other by knee lever drives constituting a shutting device until the mould halves reach their closing position. The ends of the arms remote from the connecting axis are provided with abutment faces on which a C-shaped clamp, defining a closing device, is pushed from the side opposed to the connecting axis. The closing force of the clamp is transmitted on each pair of mould halves indirectly via the arms and with relatively long lever arms with respect to the connecting axis which therefore has to stand a significant part of the reaction forces and blow pressure. Several drives and drive control systems are needed for the closing device and device holding the closed state.

Both mold halves of the blow mold known from DE 19 11 600 A are pivotally held directly at the connecting axis. Complex centering surface arrangements are provided in the mold separation plane in order to prevent an offset between both mold halves in the closed position.

U.S. Pat. No. 3,195,186 A discloses to fix in an injection moulding machine a compressed package of several mould parts from both lateral sides by means of U-shaped clamping devices which engage at edge regions of the package. Additionally, downholders are provided which are oriented perpendicular to the mould separation planes which downholders press between the clamping devices against the top and bottom sides of the package.

SUMMARY OF THE INVENTION

It is an object of the invention to provide a blow mould and a method for adjusting the mould halves of a blow mould allowing an effective formation of pre-formed parts or glass receptacles with a blow mould which is of simple mechanical design and needs a simple drive only.

The closing clamp is designed and arranged such that it pivots the mould halves about the connection axis into the closed position on each other and then presses the mould halves without gaps against each other, by sliding and pressing contact on at least parts of the outer surfaces of the mould halves. In this fashion a blow mould is achieved which is mechanically simple and consumes little space and allows a safe and firm closing of the mould parts for the blowing process. The closing clamp has at least a dual function: it transfers the mould halves from the opening position into the closed position, and it generates in the closed position the holding force for the closed state. As the closing clamp slides directly along the outer walls of the mould halves and presses the mould halves centrally against each other no joint connections are needed to take up reaction forces, which joint connections normally are not well suited to take up such reaction forces. The closing clamp is adapted by the U-shape design of the inner surface to the contour of the outer surfaces of the mould halves which, e.g., have outer surfaces shaped like cylinder sections. In this way the closing clamp which at least partially comes into contact with the outer surface of each mould halve, can grip snugly and close around the mould halves in order to ensure a firm holding of the closed position of the mould halves even in case of high interior pressure in the blow mould. Only one drive is needed for the closing procedure and for holding the mould halves in their closed position.

The high forces of several tons which act on the closing clamp during the blowing process may lead to strong mechanical loads. For that reason a replaceable contact wall surface may be secured in a region of the outer surface of at least one of the mould halves. This region will at least partially be in contact with the closing clamp in the closed position of the mould halves. The contact wall surface may be a hardened spring steel sheet or the like. In case that the contact wall surface is mechanically worn out only the contact wall surface is to be replaced but not the entire device.

In order to allow a friction free sliding of the closing clamp along the outer surfaces of the mold halves during the closing procedure, the closing clamp may include at least one rotatably supported rod or roller which comes into contact with the outer surface of at least one of the mold halves during the closing procedure. For example, in case of rotatably supported rods or rollers at both free ends of the U-shape of the inner surface of the closing clamp, which rods or rollers extend substantially parallel to the main axis of both mold halves or the connection axis, respectively, the closing clamp can be moved with reduced friction and reduced power input by a rolling movement of the rods or the rollers, respectively, when closing the mold halves.

The closing clamp should be aligned in the closing position of the mold halves with the free, engaging ends towards the center of the mold cavity or towards the center between several mold cavities, respectively, to achieve a uniform force distribution and to relieve the connection axis.

In order to move the mould halves open rapidly and automatically after pulling the closing clamp away, the mould halves may be mechanically connected to a spring element and/or a driver, the force of which will open the mould halves.

Expediently, even the movement of the closing clamp when being pulled away is used to move the mould halves open, e.g. via spring elements and/or pulling links of the closing clamp itself.

In order to increase the dimensional stability of the blow mould in the closed position, and, in order to optionally apply a downsized and compact closing clamp, at two opposite sides of the mould halves a respective abutment element like a pin or a rod may be arranged so that the closing clamp is removably clamped at least in the closed position of the mould halves between both abutment elements. The rods or abutment elements arranged at given positions will take up reaction forces from the closing clamp, e.g. reaction forces resulting from the interior pressure in the blow mould, and at the same time will support the closing clamp, respectively.

A precisely controllable compact and reliable pushing device for the closing clamp may have a pneumatic cylinder, a hydraulic cylinder or a cam controlled roller. Other types of actuators as well may be suitable.

In order to position the closing clamp in the closed position of the mould halves as close as possible at the closed blow mould, and to achieve an optimal force transmission, the connection axis is interrupted by an intermediate space through which the closing clamp is pushed.

By a single closing clamp even mould halves may be closed and held in closed condition which define more than one mould cavity in the closed position. In this case the free ends of the closing clamp generating the holding force for the closed position expediently should be aligned to the middle region between the mould cavities.

Since the closing clamp has to be adjusted for the opening procedure of the mould halves anyway, and since its drive assembly has to be designed correspondingly, the push away movement expediently may be applied to use the closing clamp even as an opening device for pivoting the mould halves away from each other.

In structurally simple way the closing clamp is integrated into the opening assembly, e.g. by coupling the closing clamp with the mould halves by spring elements and/or pulling links. The spring elements are tensioned when the closing clamp is pulled back.

When the closing clamp is pushed over the opened mould halves the closing clamp first contacts regions of the mould halves which are located close to the connection axis. Thereafter, the closing clamp slides along the outer surface of the mould halves and away from the connection axis until the blow mould is closed and finally is held closed in the closed position. The closing clamp universally functions as a closing device and as a device for holding the closed position. Optionally, the closing clamp even is utilised as an opening device such that totally only a single drive is needed for all of these different functions.

According to the method the blow mould can be forced open only by pulling back the closing clamp from the closed position into the open position. With the help of the multiple function of the closing clamp short mould closing and mould opening cycles can be achieved with reduced structural efforts and with a single drive only.

BRIEF DESCRIPTION OF THE DRAWINGS

Embodiments of the subject of the invention will be described with the help of the drawings. In the drawings is.

DETAILED DESCRIPTION OF THE INVENTION

Figure 1:
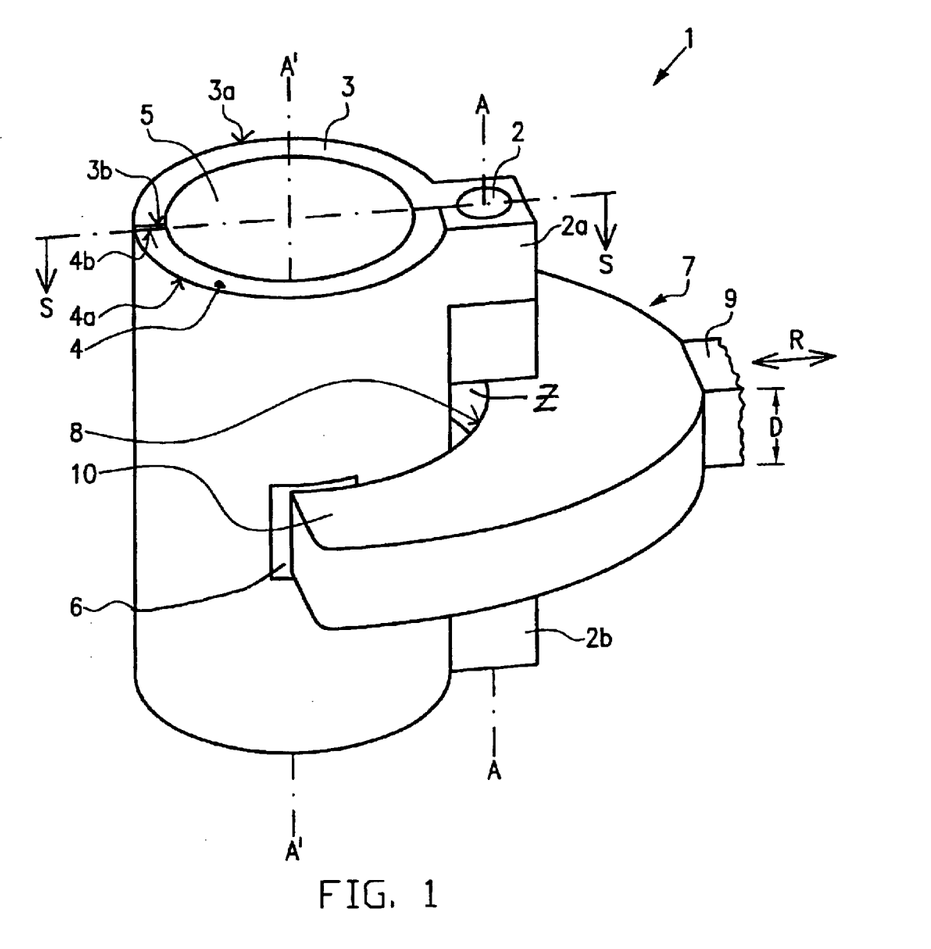
FIG. 1 a perspective view of a blow mould in the closed position.

The terms "mold" and "mould" as used herein are used interchangeably. A blow mold 1 in FIG. 1 is intended for use in a stretching machine or a glass blowing machine, and includes two mold halves 3, 4 which can be pivoted about a connection axis 2. The mold halves 3, 4 e.g. are made from steel and are designed so that they define in a closed position at least one interior mold cavity 5. In the cavity 5 a pre-formed part or a glass receptacle (not shown) may be blown into shape, i.e. may be brought into a final contour by an interior pressure of e.g. 40 bars.

The blow mold 1 in FIG. 1 includes in addition to the mold halves 3, 4 bottom and top forms (not shown). In this case the mold halves 3, 4 are substantially semi-cylindrical. The connection axis penetrates respective supporting elements 2a, 2b which are distant from each other in the direction of the longitudinal axis A of the connection axis 2.

A closing clamp 7 provided as a closing device and as a device for holding the mould halves 3, 4 in the closed position is e.g. made from high grade steel and has approximately the shape of a crescent. The closing clamp 7 has an essentially U-shaped curved interior surface 8 facing the mould halves 3, 4. The closing clamp 7 is substantially symmetric with respect to a plane S of symmetry of the blow mould 1 and in a plane essentially perpendicular to the axes A, A'. The interior surface 8 of the closing clamp 7 is shaped so that during the closing procedure at least regions located at both free ends 10 of the U-shape of the closing clamp come into direct sliding contact and pressing contact with outer surfaces 3a, 4a of the mould halves 3, 4. The closing clamp 7 is slideably provided at the side of the connection axis 2.

At the end of the closing clamp 7 remote from the mould halves 3, 4 a pushing device is provided which is not shown detail. The pushing device acts via a pushing rod 9, e.g. by a pneumatic cylinder, onto the closing clamp 7. The pushing device is designed such that the pneumatic cylinder operates in the direction R perpendicular to the axes A, A' and with a stroke of e.g. 50 mm and an actuation pressure of e.g. 100 bars.

FIG. 1 illustrates the closed position of the blow mold. The closing clamp 7 is pushed so far in the direction R over the mold halves 3, 4 that the mold halves are clamped between the free ends 10 and are completely closed. Separation surfaces 3b, 4b of the mold halves 3, 4 abut on each other tightly and without gaps. The distance between the free ends 10 of the closing clamp 7 is selected such that it substantially corresponds with the outside dimension of the closed mold halves 3, 4. The ends 10 engage the outer surfaces substantially in alignment to the center of the mold cavity. One end 10 of the closing clamp 7 may have a width of about 50 mm to about 100 mm and a thickness D of at least 100 mm, e.g. even of 180 mm.

In order to design the closing clamp 7 dimensionally stable and to allow to bring it as close to the mould halves 3, 4 as possible, the above-mentioned structure of the connection axis 2 is expedient, namely with the supporting element 2a, 2b distant from each other clearing an intermediate space Z in the direction of the axis A. Since, in this case, the connection axis 2 does not have a continuous shaft but, so to speak, is interrupted, the closing clamp 7 may have a thickness D in its portion which is pushed in the closed position of FIG. 1 into the intermediate space Z, the maximum magnitude of which only is limited by the useable distance in the intermediate space Z.

Replaceable contact wall surfaces 6 are secured at two opposite location of the outer surfaces 3a, 4a, of the mold halves 3, 4. The contact wall surface 6 e.g. may be contact metal sheets. The contact metal sheets are secured such that the free ends 10 of the closing clamp 7 clamp both mold halves 3, 4 in the closed position precisely at the locations of the contact sheet metals. Contact wall surface 6 may e.g. be made from a hardened spring steel sheet metal with a thickness of several millimeters and is inserted into a recess (not shown) such that its position is fixed and that it may be replaced upon demand.

Alternatively or additionally even the free ends 10 of the closing clamp 7 could be provided with replaceable wall surfaces, e.g. hardened steel sheet metal parts which can be replaced in case of wear.

Figure 2:
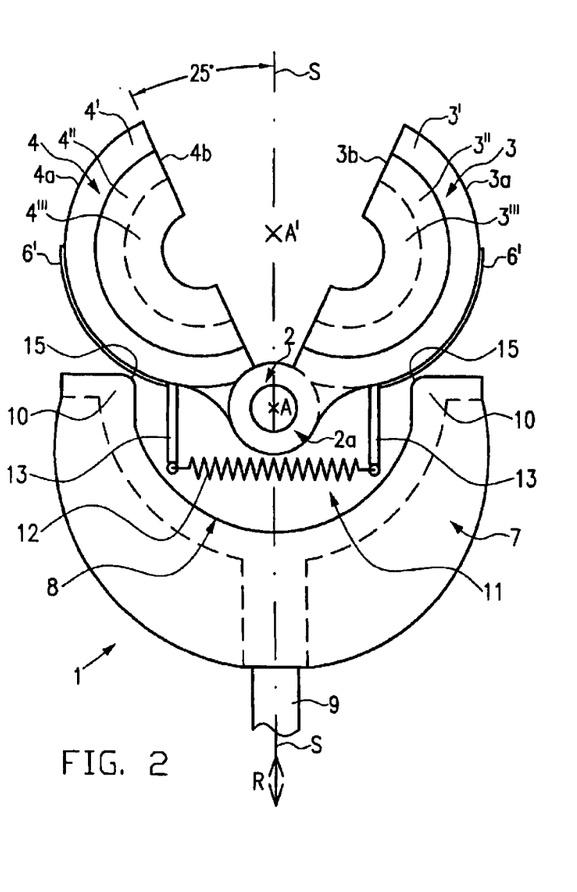
FIG. 2 a top view of a further embodiment of a blow mould in an open position.
Figure 3:
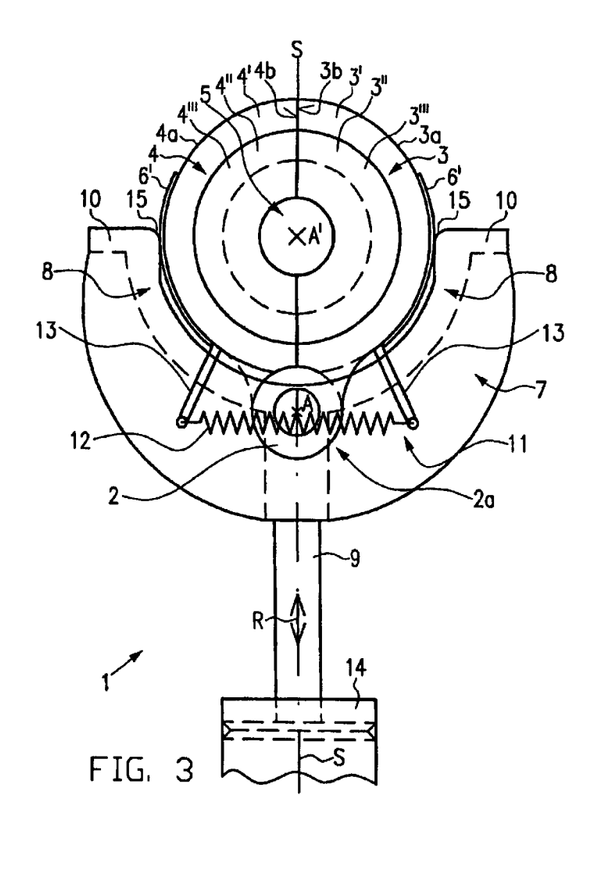
FIG. 3 a top view of the blow mould of FIG. 2 in the closed position.
Figure 4:
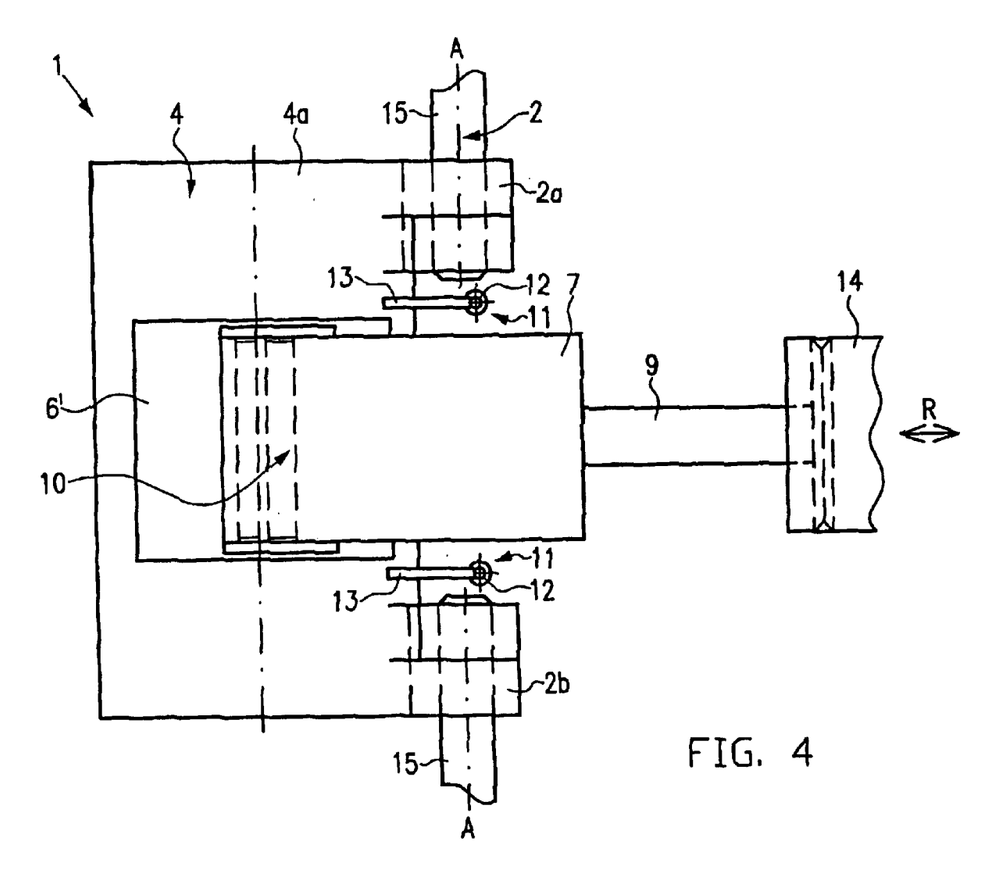
FIG. 4 a side view of the blow mould of FIG. 2.

A second embodiment of a blow mould 1 is shown in FIGS. 2–4, the structure of which corresponds to the structure of the first embodiment. A difference is that the contact sheet metals 6' secured to the outer surfaces 3a, 4a of the mould halves 3, 4 here extend further in a direction towards the connection axis 2. The friction influences between the closing clamp 7 and the mould halves 3, 4 only result in wear of the contact sheet metals 6'. Furthermore, a spring element 11 is provided to automatically move both mould halves 3, 4 open when the closing clamp 7 is moved away. The spring element 11 comprises at least one spring 12 spanned between fixation rods 13 at the mould halves 3, 4. The spring force of spring 12 pulls both mould halves 3, 4 outwardly in the opened position and about the connection axis 2, i.e. without a separate drive.

For stability reasons, e.g. two spring elements 11 may be provided. The support elements 2a, 2b are supported at the upper end and the lower end of the connection axis on stub shafts 15 (FIG. 4), respectively, which are attached to a not shown component of the blow mould. In FIGS. 3 and 4 a pneumatic cylinder 14 is indicated at the push rod 9 of the pushing device. In this embodiment both mould halves 3, 4 have a three-part structure. Each mould halve consists of an outer shell 3', 4', and inner receptacle form 3''', 4''', and a mother form 3'' inserted between the outer shell and the receptacle form. The mother form 3'' may be equipped with not shown cooling holes or heating holes, respectively, in order to cool or heat the receptacle form 3''', 4'''. In case that no mother form is used, the cooling holes/heating holes alternatively could be provided in the outer shell 3', 4'.

It is important that the mould separation surfaces 3b, 4b are pressed against each other without gaps for tightly defining the mould cavity 5. Alternatively, it is possible to press the separation surfaces 3b, 4b against each other without gaps only in the region of the receptacle form 3''', 4''', such that in the closed position gaps may remain between the separation surfaces 3b, 4b in the region of the shells 3', 4', and/or of the mother forms 3'', 4''.

Figure 5:
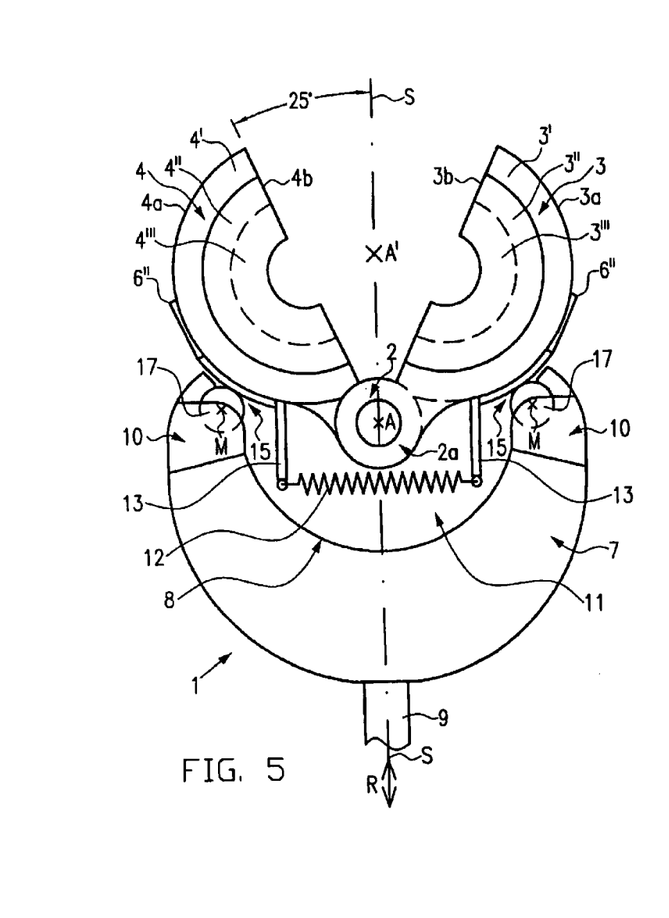
FIG. 5 a schematic top view of a further embodiment of a blow mould in the open position, FIG. 6 a top view of the blow mould of FIG. 5 in the closed position, FIG. 7 a schematic top view of a further embodiment of a blow mould in the open position, FIG. 8 a top view of the blow mould of FIG. 7 in the closed position, FIG. 9 a schematic top view of blow moulds arranged in a rotating runner assembly, FIG. 10 a top view of a further embodiment of a blow mould in a closed position, and FIG. 11 a top view of a further embodiment of a blow mould in the closed position.
Figure 6:
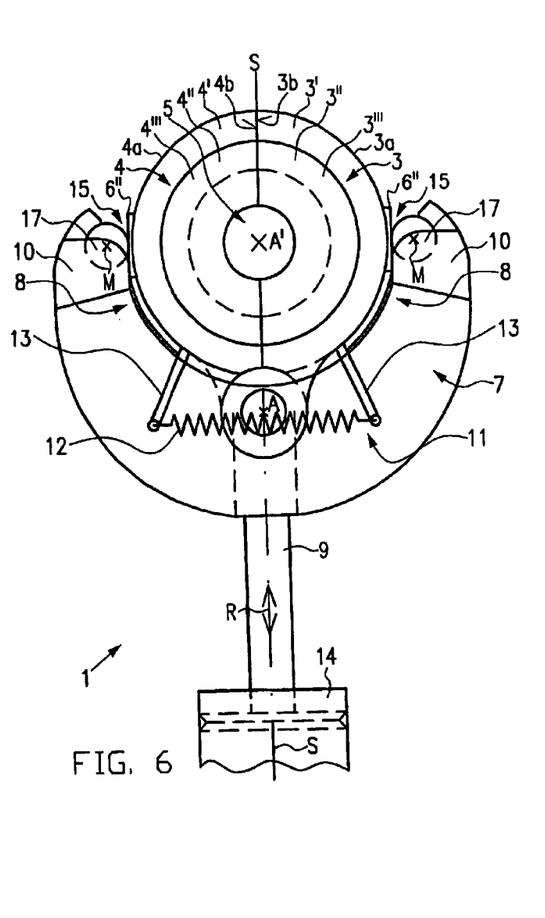

A third embodiment of a blow mould 1 according to the invention is illustrated in FIGS. 5 and 6. The blow mould 1 of FIGS. 5 and 6 differs from the embodiment of FIGS. 2 to 4, because a rotary rod or a roller 17 is rotatably supported in each free end 10 of the closing clamp 7. The rotary rod or the roller 17 extends parallel to the axis A of the blow mould 1, and e.g. is provided in a recess. The rods 17 are rotatably supported in the closing clamp 7 about their axes M and are located at both sides of the plane S of symmetry such that during the closing procedure they will find direct contact with the outer surfaces of the mould halves or contact metal sheets 6' provided there.

The contact metal sheets 6'' have flattened portions at locations remote from the connection axis 2. The rotary rods are seated at the flattened portions in the closed position (FIG. 6), in order to produce a sort of an over dead point latching or a ratchet latching function, respectively.

Figure 7:
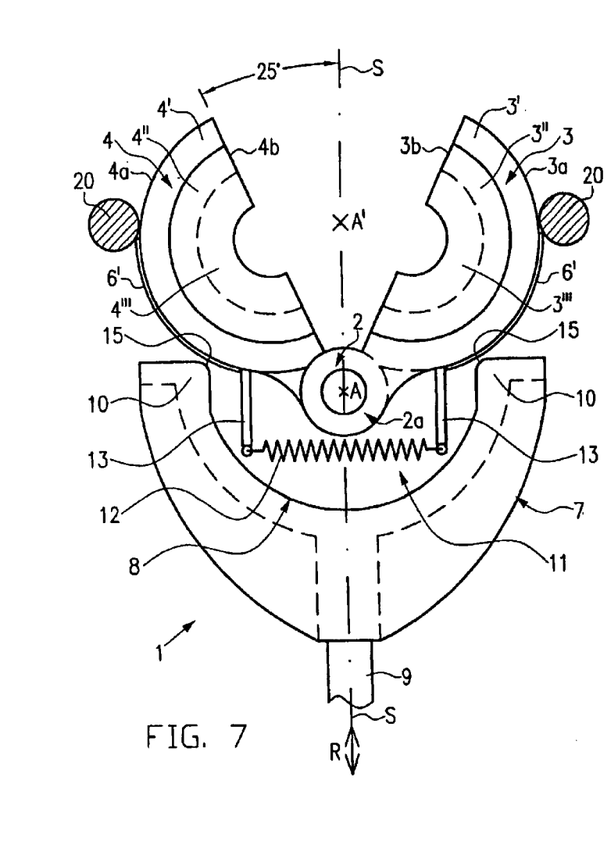
Figure 8:
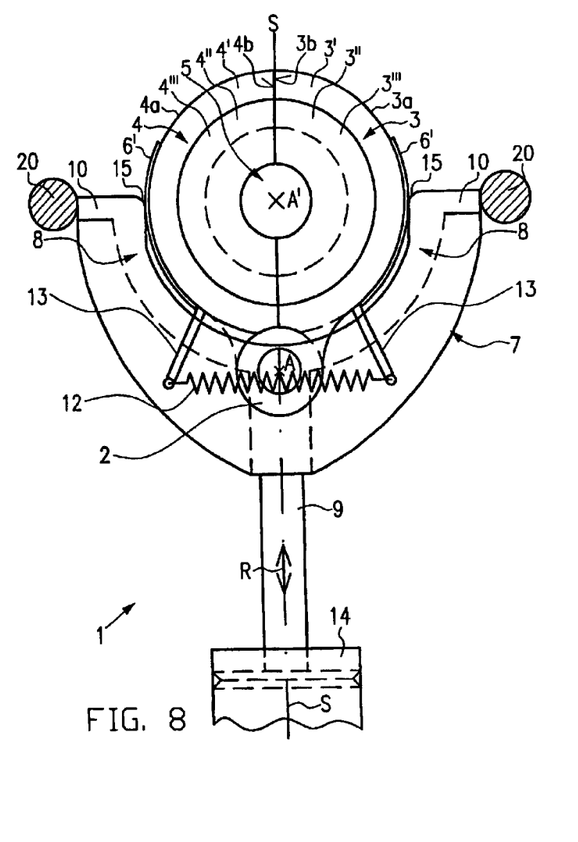

The further embodiment of FIGS. 7 and 8 corresponds substantially with the embodiment of FIGS. 2–4. However, at both sides of the blow mould halves 3, 4 cylindrical or rod shaped abutment elements 20 made from steel are placed which are parallel to the axis A'. The abutment elements 20 are secured in fixed positions at not shown supporting components.

In FIG. 8 the relative distance between the abutment elements 20 is selected such that in the closed position of the blow mould 1 the free ends 10 of the closing clamp 7 respectively are clamped between one abutment element 20 and the respective outer surface 3a, 4a of the mould halves 3, 4. In this case the abutment elements 20 will take up a significant part of the forces, which e.g. act on the mould halves 3, 4 and the closing clamp 7 due to the pressure occurring in cavity 5 during the blowing process. As a consequence, the dimensions of the closing clamp 7 may be reduced despite such high forces and the entire assembly may save mounting space.

In the opened position the mould halves 3, 4 in FIG. 7 will rest 4a at the abutment elements 20 by their outer surfaces 3a, 4a. For that reason the maximum opening angle between the mould halves will be defined. The spring element 11 may be dimensioned such that the spring 12 in FIG. 7, i.e. in the opened condition of the blow mould, will be relaxed at least substantially.

Figure 9:
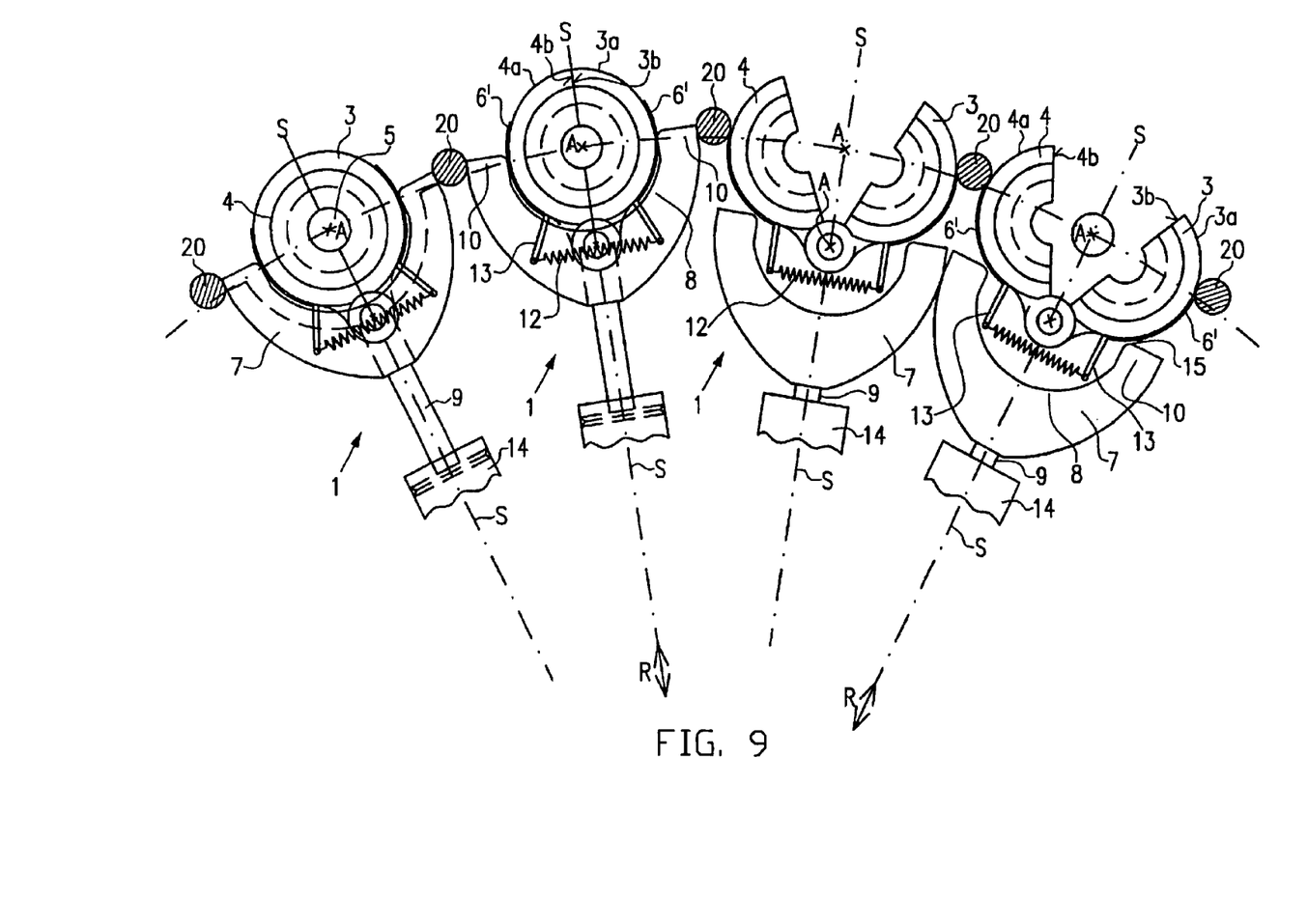

In FIG. 9 a rotary runner assembly containing several blow moulds 1 is illustrated schematically. Four blow moulds 1 as in the embodiment shown in FIGS. 7 and 8 are arranged side-by-side along the arc of a circle. The two blow moulds 1 on the left side are shown in their closed positions as in FIG. 8. The two blow moulds 1 on the right side are shown in the opened positions as in FIG. 7. In this case one and the same abutment element 20 is associated to respective two blow moulds 1 such that the oppositely directed reaction forces of two closed blow moulds 1 are substantially cancelled at the abutment element 20. The arrangement is mechanically particularly stable and extremely space saving.

An arrangement having a respective single abutment element 20 between two adjacent blow moulds is not only of advantage in a rotary runner assembly, but also in a linear runner assembly in which the blow moulds are arranged in a linear array.

The method according to the invention will be described for a stretching blow cycle with the help of FIGS. 2–4, even though a similar operation also may be applied for forming cycles in a glass blowing machine. Prior to a stretching blow cycle the blow mold 1 is in the opened position shown in FIG. 2. Both mold halves 3, 4 are pivoted e.g. about 25° relative to the plane S of symmetry. The closing clamp 7 remains shifted away in the direction R that is far enough from mold halves 3, 4 that there is no contact between the closing clamp 7 and an outer surface 3a, 4a. Alternatively the free ends 10 of the clamping clamp 7 could, however, define the maximal opening angle of the mold halves 3, 4 by contact with the contact surfaces 6, 6'. In FIG. 2, first the springs 12 are holding the mold halves 3, 4 in the opened position. Next a pre-formed part is inserted into the cavity 5. Then the mold halves 3, 4 are brought into the closed position according to FIG. 2, as follows. The closing clamp 7 is adjusted by the pneumatic cylinder 14 until it contacts by portions 15 of the free ends 10 the outer surfaces 3a, 4a in the vicinity of the connection axis 2. In FIGS. 2–4 in this case, e.g. the contact surfaces 6' are contacted. By means of the pneumatic cylinder 14 the mold halves 3, 4 then are pivoted to each other into the closed position about the connection axis 2 and counter to the force of the spring 12. In the closed position shown in FIG. 3 the separation surfaces 3*b*, 4*b* are abutting each other tightly or without gaps, respectively. During the closing operation the closing clamp 7 slides along the outer surfaces 3*a*, 4*a*, starting from the side of the connection axis 2, and into the position shown in FIG. 3. The distance between the free ends 10 is selected such that it substantially corresponds to the outer dimension of the mold halves 3, 4 in their closed position, and such that the closing clamp 7 will produce the needed force to hold the mold halves in the closed position. In the closed position the top and bottom forms (not shown) are moved towards the mold halves 3, 4. Subsequently, a blowing pressure of e.g. up to 40 bars is produced for the stretching blowing process in the closed blow mold 1. The pre-formed part is then brought into its desired contoured shape.

As a consequence of the function of the closing clamp as a closing device and as a device for holding the blow mould in the closed position according to the invention, it is assured that the necessary closing force will be maintained even in case of high inner pressures in the cavity 5, and without additional pressure back-up means.

After completion of the stretching blowing process cycle the blow mould 1 is opened by driving the pneumatic cylinder 14 in the opposite direction and by pulling the closing clamp 7 in the direction R away from the mould halves 3, 4. The spring 10, which has been stretched during the closing operation, then will pivot the mould halves 3, 4 outwardly about the connection axis 2.

The blow mould according to the invention and the method according to the invention allow to safely close the blow mould, and to hold the blow mould closed in the closed position, by a mechanically simple and space saving design and without the need of further latching means.

Figure 10:
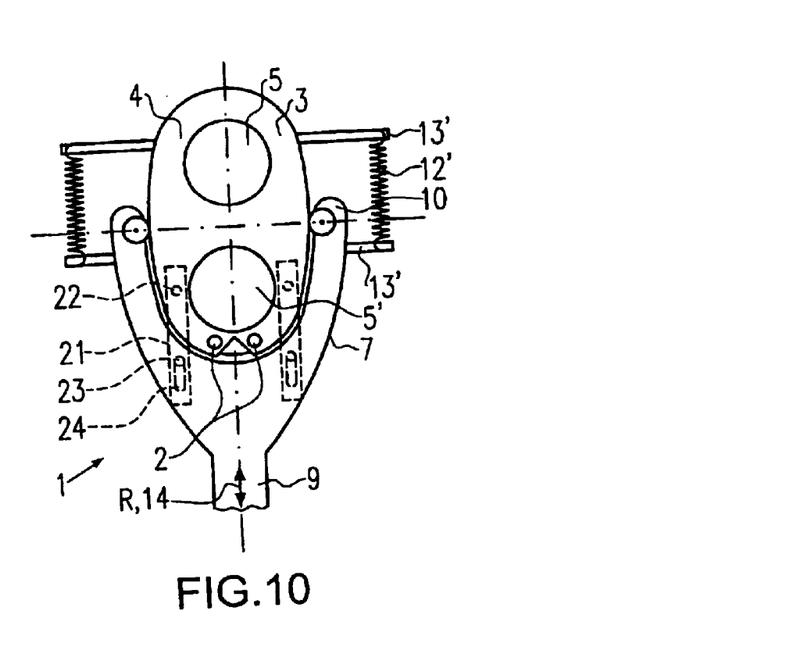

In the further embodiment of the blow mould 1 in FIG. 10 the closing clamp additionally is used as an opening device. With the help of tension springs 12' attached to anchor rods 13' of the mould halves 3, 4 and the closing clamp 7, respectively, which springs 12' are substantially relaxed in the shown closed position, the mould halves 3, 4 will be spread apart into the opened position about the connection axis 2 when the closing clamp 7 is pulled backwards. The connection axis 2 is divided in this case. The open position may be defined by the contact between the free ends 10 of the closing clamp 7 and the mould halves 3, 4. As an option, furthermore, links 21 may be linked to each mould halve 3, 4 at anchors 22, 23 to adjust the mould halves 3, 4 forcedly into the opened position as soon as the closing clamp 7 is moved away from the closed position. It is to be noted for FIG. 10 that, of course, both mould halves 3, 4 may define more than one cavity 5, 5' with each other. The free ends 10, of the closing clamp 7, in this case, should then engage relatively precisely in the middle between both cavities 5, 5'. Even more than two cavities 5, 5' might be provided as well.

In the embodiment of FIG. 10 the equipment with the tension springs 10, 12 might suffice as an opening device. For safety reasons, however, the pulling links 21 may be provided additionally. To avoid an undesirable interference of the pulling links 21 in the closed position it is of advantage to support the pulling links by longitudinal holes 24 with a clearance such that the closing clamp 7 first will carry out a predetermined force stroke out of the closed position before the pulling links 21 come into action. Alternatively, it is possible to omit the tension springs 12' and to open the mould halves 3, 4 with the help of the pulling links 21 only, as is indicated in FIG. 11 for a further embodiment of a blow mould 1.

Figure 11:
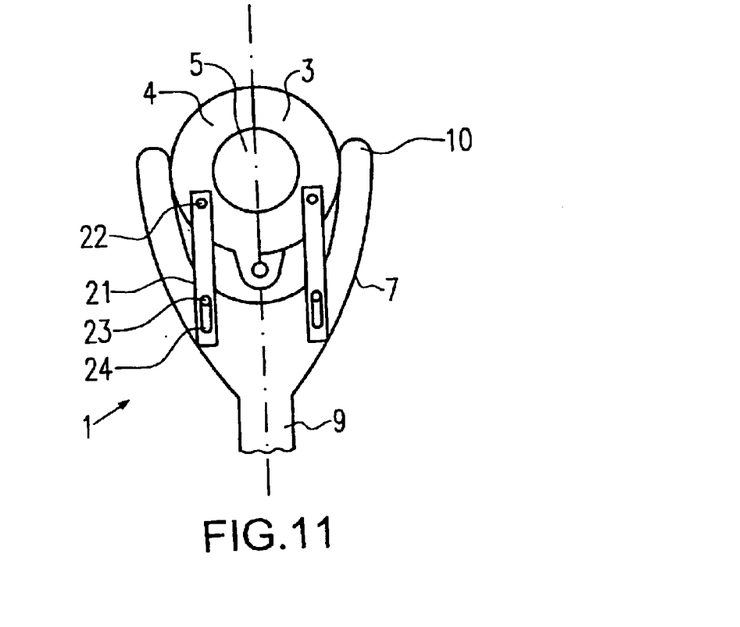

In case of the blow mould 1 in FIG. 11 both mould halves 3, 4 exclusively are opened with the help of the pulling links 21. The pulling links 21, e.g. are linked to pins 22, 23 of the mould halves 3, 4 and to the closing clamp 7. Longitudinal holes 24 provide a free partial stroke thanks to which the pulling links 21 do not interfere properly when the mould halves 3, 4 are held in the closed position but start to act only after a predetermined stroke of the closing clamp 7 takes place when the closing clamp 7 is pulled away.

What is claimed is:

1. Blow mold (1) for a stretching blow machine or a glass blowing machine, comprising two mold halves (3, 4) which can be pivoted to each other about at least one connection axis (2) for forming at least one mold cavity (5) defined by inner walls of the mold halves, a closing device for pivoting the mold halves to each other into a closed position, a closing clamp (7) having a substantially U-shaped inner surface (8) adapted to be driven by a pushing device (9, 14) for pressing the mold halves against each other without gaps into the closed position, both mold halves (3, 4) being directly connected with each other at one side by the connection axis (2), the closing clamp (7) being arranged at the side of the mold halves facing the connection axis (2) and pushable as a closing device directly on outer surfaces of the mold halves (3, 4) from the side of the connection axis (2), the pushed closing clamp (7) defining in its pushed condition a device for holding the closed mold halves in their closed position.

2. Blow mold as in claim 1, and the outer surfaces of both mold halves (3, 4) are provided with one of sliding and pressure contact wall surfaces (6, 6', 6") for the closing clamp (7).

3. Blow mold as in claim 1, the substantially U-shaped inner surface (8) of the closing clamp (7) in end regions (10) contacting the outer surfaces of the mold halves is provided with one of a rotatably supported rod and a roller (17) for each mold halves.

4. Blow mold as in claim 1, wherein in the closed position the closing clamp (7) free end portions (10) contacting the outer surfaces of the mold halves (3, 4) are aligned one of at least substantially towards the center of the mold cavity (5) and the middle between several mold cavities (5, 5').

5. Blow mold as in claim 1, wherein the mold halves (3, 4) are mechanically connected to one of a spring element (11) and to a driver, and that one of the spring force of the spring element (11) and the force of the driver is acting at the mold halves (3, 4) in the opening direction about the connection axis (2).

6. Blow mold as in claim 1, and stationary abutment elements (20) are provided in opening pivoting direction about the connection axis (2) at opposed sides of the mold halves (3, 4), and that the closing clamp (7) in the closed position is clamped detachably between the abutment elements (20).

7. Blow mold as in claim 1, wherein a pushing device (9, 14) of the closing clamp (7) is provided with one of a pneumatic cylinder (14), a hydraulic cylinder and a cam controlled roller.

8. Blow mold as in claim 1, wherein the connection axis (2) consists of two coaxial and axially spaced apart stub shafts (15) at which the respective mold halve (3, 4) is supported with supporting elements (2*a*, 2*b*), and that the supporting elements (2*a*, 2*b*,) define an intermediate space (Z) between the stub shafts (15) in the direction of the connection axis (2) allowing to push the closing clamp (7) through and over the mold halves (3, 4).

9. Blow mold as in claim 1, wherein in the closed position the inner walls of the mold halves (3, 4) more than one mold cavity (5, 5').

10. Blow mold as in claim 1, wherein the closing clamp (7) is formed as an opening device for pivoting apart the mold halves (3, 4).

11. Blow mold as in claim 10, wherein the closing clamp (7) is coupled with the mold halves (3, 4) via one of spring elements (12') and pulling links (21), and that the spring elements (12') are stretched during the pulling back movement of the closing clamp (7) away from the closed position.

12. Method for adjusting two mold halves (3, 4) of a blow mold which are to be pivoted about at least one connection axis (2), in a stretching blow machine or a glass blowing machine, comprising pivoting the mold halves to each other by means of a closing device into a closed position in which both mold halves define at least one mold cavity (5, 5'), pressing both mold halves against each other in the closed position by means of a closing clamp (7), when shifted into an engagement position, first pivoting both mold halves (3, 4) into the closed position by sliding and pressing contact of the closing clamp (7), which is directly shifted from the side of the connection axis (2) over the outer surfaces of the mold halves (3, 4), and pressing both mold halves (3, 4) against each other without gaps.

13. Method as in claim 12, and forcing the mold halves (3, 4) out of the closed position by means of the closing clamp (7) and by pulling away the closing clamp (7) which is coupled to the mold halves (3, 4).

14. Blow mold as in claim 2, wherein the pressure contact wall surfaces are replaceable contact wall surfaces.

* * * * *

UNITED STATES PATENT AND TRADEMARK OFFICE
CERTIFICATE OF CORRECTION

PATENT NO. : 6,951,629 B2 Page 1 of 1
APPLICATION NO. : 10/297078
DATED : October 4, 2005
INVENTOR(S) : Hermann E.H. Kronseder It is certified that error appears in the above-identified patent and that said Letters Patent is hereby corrected as shown below:

On the Title Page:

At item (76) Inventor, the correct spelling of Inventor's location in Germany is "Woerth".

In the Claims:

Column 9, Line 2

In Claim 9, line 2, "(3, 4) more" should read --(3, 4) define more--.

Signed and Sealed this

Fourteenth Day of November, 2006

JON W. DUDAS
*Director of the United States Patent and Trademark Office*